(12) United States Patent
Payton

(10) Patent No.: US 7,158,511 B2
(45) Date of Patent: Jan. 2, 2007

(54) METHOD AND APPARATUS FOR PROVIDING DIRECTED COMMUNICATIONS THROUGH A NETWORKED ARRAY OF NODES

(75) Inventor: David W. Payton, Woodland Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 971 days.

(21) Appl. No.: 09/966,166

(22) Filed: Sep. 27, 2001

(65) Prior Publication Data

US 2002/0036989 A1   Mar. 28, 2002

Related U.S. Application Data

(60) Provisional application No. 60/235,860, filed on Sep. 27, 2000.

(51) Int. Cl.
  H04L 12/28 (2006.01)
  H04L 12/56 (2006.01)
(52) U.S. Cl. ................................. 370/389; 370/400
(58) Field of Classification Search .......... 370/310, 370/315, 338, 351, 389, 392, 400
  See application file for complete search history.

(56) References Cited

U.S. PATENT DOCUMENTS

| 4,028,533 | A | | 6/1977 | Matsubara |
| 5,157,692 | A | * | 10/1992 | Horie et al. ............... 375/260 |
| 5,181,017 | A | | 1/1993 | Frey, Jr. et al. |
| 5,233,604 | A | | 8/1993 | Ahmadi et al. |
| 5,390,173 | A | * | 2/1995 | Spinney et al. ............ 370/393 |
| 5,481,539 | A | | 1/1996 | Hassan et al. |
| 5,533,198 | A | * | 7/1996 | Thorson ................... 709/239 |
| 5,561,790 | A | | 10/1996 | Fusaro |
| 5,587,995 | A | | 12/1996 | Takebe et al. |
| 5,675,741 | A | | 10/1997 | Aggarwal et al. |
| 5,946,083 | A | | 8/1999 | Melendez et al. |
| 5,991,300 | A | | 11/1999 | Tappan |

(Continued)

FOREIGN PATENT DOCUMENTS

WO  9705725  2/1997

OTHER PUBLICATIONS

D. W. Gage, "Command and Control for Many-Robot Systems", In the Nineteenth Annual AUVS Technical Symposium (AUVS-91), Huntsville, AL, Jun. 22-24, 1992. Reprinted in Unmanned Systems Magazine, 10(4):28-34, Fall 1992.

(Continued)

Primary Examiner—Kevin C. Harper
(74) Attorney, Agent, or Firm—Tope-McKay & Associates

(57) ABSTRACT

A method and apparatus are presented for messaging within a plurality of nodes 100, wherein each node 100 includes a processor 208, a memory 210 connected with the processor 208, and a directional communication interface 204 connected with the processor 208. The nodes 100 are operative for receiving a message including an address code with a relative target address of an intended recipient node 106; for processing the address code to determine if the current node 100 is the intended recipient node 106; for modifying the message based on the direction from which the message was received and is to be transmitted; and for re-transmitting the message including a modified address code. The nodes 100 each repeat these actions to propagate a message along multiple paths until the message reaches a desired recipient, thereby providing path redundancy without the need for the use of unique node 100 identities or locations.

61 Claims, 5 Drawing Sheets

U.S. PATENT DOCUMENTS

| | | |
|---|---|---|
| 6,154,139 A | 11/2000 | Heller |
| 6,195,020 B1 | 2/2001 | Brodeur, Sr. et al. |
| 6,208,247 B1 | 3/2001 | Agre et al. |
| 6,311,129 B1 | 10/2001 | Lin |
| 2002/0114286 A1* | 8/2002 | Iwamura et al. ............ 370/252 |

OTHER PUBLICATIONS

D. W. Gage, "Many Robot Systems", SPAWAR web page, http://www.nose.mil.robots/research/manyrobo/manyrobo.html.

Robertazzi, T., et al. "Deflection strategies for the Manhattan Street network" Communications—Rising to the Heights. Denver, Jun. 23-26, 1991, Proc. of the Int'l Conference on Communications, New York, IEEE, US, vol. 1, Jun. 23, 1991, pp. 1652-1658, XP010043983.

Duato, J., "A theory of deadlock-free adaptive multicast routing in wormhole networks" IEEE Transactions on Parallel and Distributed Systems, IEEE Inc, New York, US, vol. 6. No. 9, Sep. 1, 1995, pp. 976-987, XP000533969.

* cited by examiner

METHOD AND APPARATUS FOR PROVIDING DIRECTED COMMUNICATIONS THROUGH A NETWORKED ARRAY OF NODES

PRIORITY CLAIM

This application claims the benefit of priority to provisional application No. 60/235,860, filed in the United States on Sep. 27, 2000, and titled "Directed Communication Through a Networked Array".

STATEMENT OF GOVERNMENT RIGHTS

Portions of this invention was made or used in conjunction with U.S. Government support from the Defense Advanced Research Projects Agency, under Contract No. N66001-99-C-8514. The U.S. Government may have certain rights in this invention.

BACKGROUND (1) Technical Field

The present invention is related to computer network communications. More specifically, the present invention provides a method, an apparatus, and a computer program product for providing directed communications through a networked array of nodes.

(2) Prior Art

Over the past several decades, the electronic communications field, particularly in the area of wireless communications, has exploded. In addition, the abilities of small processing devices have increased considerably while the cost of these devices has decreased. Wireless communication generally takes place between specific devices or nodes. In order to perform tasks such as developing routes through a network, it has traditionally been necessary to provide each member of a network with a unique identification so that specific devices may communicate. For example, in a cellular network or in an ad-hoc network, a unique identification or address is assigned to each device so that it may exclusively receive calls targeted to its address. Historically, the address of a device has been used for setting up a call, but the address itself was not intended to convey information regarding the location of the device.

More recently, location-based services have become an important focus of development in wireless communications. Through the use of a positioning system such as the global positioning system (GPS), or through the use of triangulation between sets of base stations with known positions, or through explicit user input regarding location, it is possible use the precise location of an individual user in order to tailor the service provided to that user. For example, customized activity menus may be developed for a user based on their location, including items such as local movies, restaurants, points of interest, etc. Generally, these systems require both an address of the particular device requesting service and a location for the device.

Many situations exist, however, in which it is impractical to provide each node with both unique device identification and with a location detection device such as a GPS device, but in which it is still desirable to transmit a message to a device at a particular location. Examples of these situations include those that use distributed sensor networks, smart mines, nanosatellites, and distributed robots where a large number of locally-networked nodes need to coordinate and share information. In these situations, it would be desirable to provide a communication mechanism that allows communication with a node at a particular distance and direction from some other node within an array of nodes. It is further desirable that the communication mechanism be operable without the use of unique node identities.

SUMMARY OF THE INVENTION

The present invention provides a method for messaging within a plurality of nodes, wherein each of the nodes includes a processor, a memory connected with the processor, and a directional communication interface. The method comprises a first step of receiving a message including an address code and corresponding data at a current node among the plurality of nodes. The address code includes a relative target address of the node to which the corresponding message is intended to be sent. Next, a step of processing the received address code is performed to determine if the address code indicates that the current node is the intended recipient of the message. The message then is modified based on the direction from which the message was received, the address code in the message, and the direction to which the message is to be re-transmitted. After modification, the message is re-transmitted including the modified address code, in each direction in which it is to be re-transmitted. The address code is modified to specifically account for the direction in which it is to be re-transmitted.

The above steps are repeated at every node until the message reaches the node to which the message is intended to be sent. Thus a message may be propagated across a plurality of nodes along multiple paths until the message reaches a desired recipient, thereby providing path redundancy without the need for the use of unique node identities.

The method may further comprise a step of expiring the message to prevent its re-transmission. This can be accomplished in several different ways, including time-stamping the message when it is initially transmitted and using the time-stamp for a time-based message termination. Additionally, the message may be expired through the use of a cumulative hop-count with messages expiring after a sufficient number of hops. One additional method for expiring messages is to provide a unique message identification that is recorded at each node as the message propagates through the plurality of nodes. Every time a message is received at a node, the node checks to determine whether the message has been to that node, and if so, the message is not re-transmitted. The nodes may also be configured to pass a message a predetermined number of times.

The address code within a message may also be constructed so that multiple nodes among the plurality nodes are intended recipients of the message. These nodes may be a group of nodes within the same general physical locality or they may be dispersed throughout the plurality of nodes.

Additionally, the message may be re-transmitted in a subset of the directions available for transmission by the directional transmitter. This subset may be determined from the address code in the message and the direction from which the message was received. In a more preferred method, the message may be re-transmitted only in directions which result in re-transmission toward the node to which the message is intended to be sent, whereby the propagation of the message always occurs toward the intended recipient.

Further, an optional step may be provided for modifying the data of the message at a node prior to re-transmission, whereby the message may accumulate information as it propagates to the intended recipient.

Also, a portion of the nodes may include at least one sensor for generating sensor information, and wherein in the step of modifying the data, sensor information may be used to modify the data of the message prior to re-transmission.

In another embodiment, the message may contain another node to be designated as the intended recipient after the message reaches the node to which the message was intended to be sent. Thus, a message may be hopped from intended recipient node to intended recipient node. The nodes may modify the data along the re-transmission path such that cumulative changes to the data may take place as the message is hopped across the plurality of nodes.

Preferably, the re-transmitting of the message across the plurality of nodes occurs in a two-dimensional plane and each of the nodes transmits and receives in four possible directions.

More preferably, the four possible directions are at 90 degree angles to each other, and a message is received from a direction represented by (X, Y), and wherein the address code is modified such that when it is:

a. transmitted 90 degrees to the left of the direction in which it is received, the modified address code is (Y, −(X+1));
b. transmitted along the same direction in which it is received, the modified address code is (X, Y−1); and
c. transmitted 90 degrees to the right of the direction in which it is received, the modified address code is (−Y, X−1).

The data of the messages transmitted by the present invention may be commands. Furthermore, at least a portion of the nodes used in conjunction with the present invention may be mobile. Finally, the re-transmitting of the message across the plurality of nodes may occur in a three-dimensional volume.

The present invention may comprise a plurality of nodes produced together and used together as a single item. On the other hand, it may comprise a single node configured for use with other nodes to form a network of nodes as described herein. In another embodiment, the present invention takes the form of a computer program product recorded on a recording medium.

These features of the present invention will be described more fully in the following description and the accompanying drawings.

DETAILED DESCRIPTION

The present invention provides a computer program product, a method, and an apparatus for providing directed communications through a networked array of nodes. It should be understood that this description is not intended to limit the invention. On the contrary, the invention is intended to cover alternatives, modifications and equivalents, which are included in the spirit and scope of the invention as defined by the appended claims. Furthermore, in the following detailed description of the present invention numerous specific details are set forth in order to provide a thorough understanding of the present invention. However, it will be obvious to one of ordinary skill in the art that the present invention may be practiced without the specific details.

In order to provide a working frame of reference, first a glossary of terms used in the description and claims is given as a central resource for the reader. The glossary is not intended to provide specific limitations regarding the terms used, but rather, is intended to assist the reader by providing a general feel for some of the terms used herein. Next, a brief introduction is provided in the form of a narrative description of the present invention to give a conceptual understanding prior to developing the specific details.

Glossary

Means—Generally, for purposes of this invention, the term refers to a computer program or sub-program, or a portion of a computer program operative for performing the task that the means is for. The means is generally considered to be language and computer platform independent, and in the form of computer instructions (or code) that may be either in the form of software or hardware.

Node—A node, for purposes of the present invention is a computing system including a processor, a memory connected with the processor, and a directional communication interface connected with the processor. The nodes are designed to facilitate propagation of a message across a plurality of nodes to an intended recipient. The nodes generally communicate via a wireless communication interface such as an infrared transmitter/receiver, or a laser transmitter/receiver. However, it is contemplated that the techniques disclosed herein could also be used in a wired environment. Additionally, the nodes may also utilize sensors or other means for gathering information to incorporate in a message to send to a desired recipient. Nodes may be stationary or they may incorporate means for mobility such as wheels.

Introduction

Figure 1:
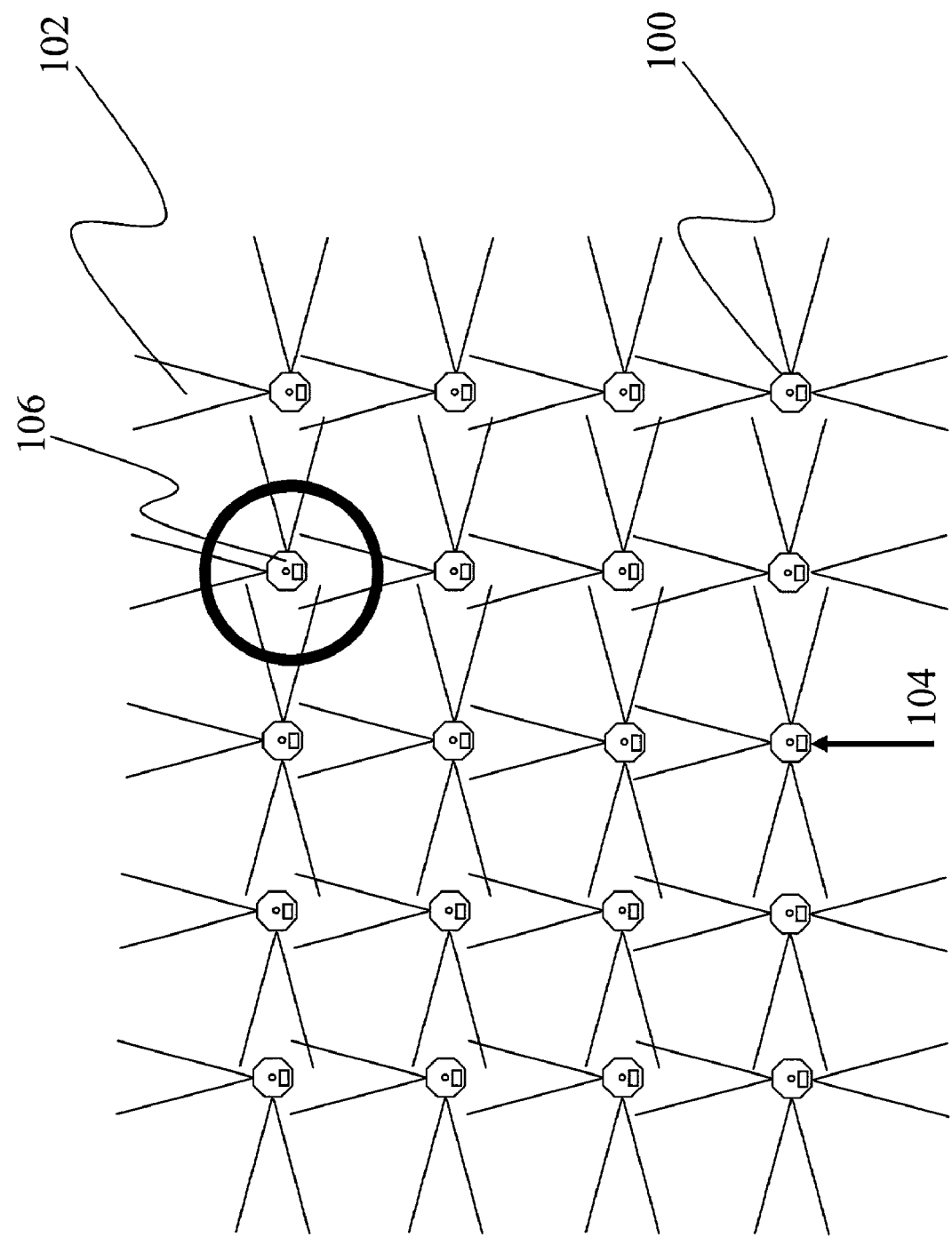
FIG. 1 is an illustrative diagram depicting a plurality of nodes communicating via the techniques of the present invention.

An illustrative diagram depicting a plurality of nodes communicating via the techniques of the present invention is provided in FIG. 1. One may envision the plurality of nodes, for example, as a group of small robots roughly evenly spaced over an area. As can be seen, a plurality of nodes 100 is provided, with each node among the plurality able to communicate in four possible directions. Thus, in this example, the nodes could each incorporate a four-directional infrared communication system. Transmissions between nodes 100 are represented by transmission cones 102, which represent a communication medium used for transferring information between the nodes 100. Communication mediums used with the presentation can include, for example, optical, radio frequency, and acoustic mediums. The transmission cones 102 are provided in the form of a cone to indicate that the transmission medium has directionality and also has some degree of spread as a function of distance from a node 100. A message source 104, depicted as a bolded arrow, provides a message to be transmitted to an intended recipient node 106. The message source 104 could be a node 100, or the message may be a command addressed to an intended recipient node 104 from a user. An address code is provided within the message, which is transformed at each node prior to re-transmission of the message. In the case of the nodes 100 being robots, the message is received from the message source 104, and is passed from robot to robot such that it will ultimately reach the intended recipient. As it is passed, an address code is modified to ensure that when the right robot is reached, it has a unique value so that the robot can determine that it is the intended recipient. Since, in this case the message can be transmitted/received in four possible directions, the changes to (transformation of) the address code is intended to take this into account. The result of the address code's transformation at each node 100 is such that only when the message reaches the desired destination node 106 or nodes, will the address code achieve the unique value. The address code typically represents an offset of the current node 100 from the intended recipient node 106. This assumes that each node does not know its orientation relative to other nodes and that nodes do not share a common reference frame. However, when a node receives a message, it uses the direction of the received message to establish a local reference frame. The node then performs transformations on the address code such that for each direction the message is retransmitted, that direction of transmission forms the basis for the new reference frame. For example, in a simple sense, the address code could represent an (X, Y) coordinate offset from the current node to the destination node, specified in the reference frame determined by the direction from which the current node has received the message.

Upon re-transmission of the message, each node transforms the address code to the coordinate frame corresponding to the direction of transmission so that each successive recipient node will receive an address code that suitably corresponds to the direction from which the message is received. In addition to the coordinate change, the transformation also increments or decrements the address code offsets so that the recipient nodes receive an address code that continues to correspond to the remaining distance and direction between themselves and the intended destination. In other words, the purpose of the transformation is to allow the resulting address code of the message to reach the same value at the intended recipient, regardless of the path taken.

Once the message has reached the intended recipient node 106, no further re-transmissions are necessary from the recipient node 106. Other nodes will continue to re-transmit the message until a message expiration means is triggered or applied to prevent the message from constantly re-circulating through the plurality of nodes 100.

The purpose of this introduction was intended to provide the reader with a general familiarity with the present invention. However, the full scope of the invention comprises several aspects, including a method for messaging within a plurality of nodes; a system for directed communication within a data network comprising a plurality of nodes; a node for communication with a system for directed communication within a data network; and a computer program product for facilitating messaging within a plurality of nodes. Each of these aspects will be described in greater detail below.

Specific Details of the Invention

Figure 2:
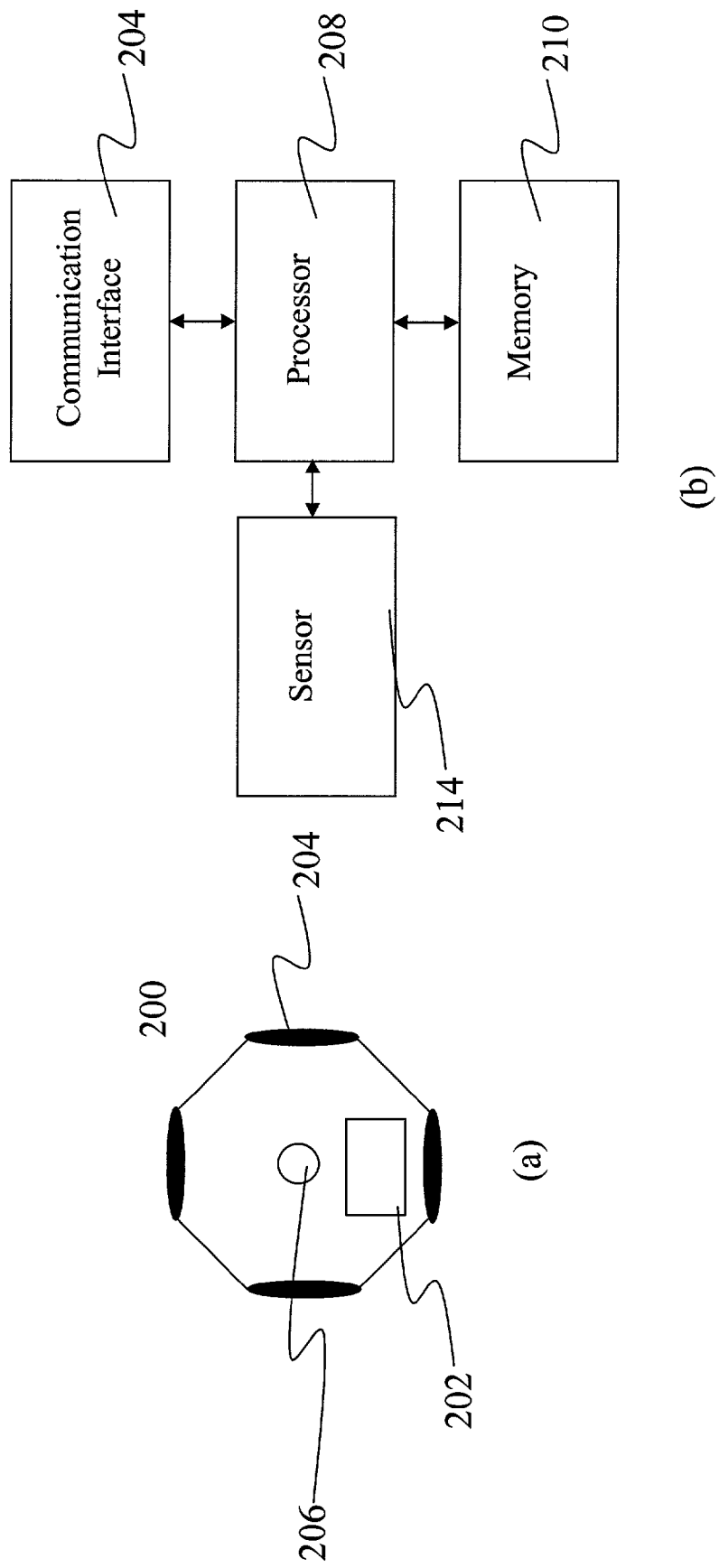
FIG. 2(a) is a diagram depicting an example of a node used in conjunction with the present invention and configured to communicate in four directions.
FIG. 2(b) is a block diagram depicting the components of the processing unit incorporated within the nodes to facilitate the communication functions of the present invention.

Before describing various aspects of the present invention, a diagram depicting an example of a node used in conjunction with the present invention is provided in FIG. 2(a) and FIG. 2(b). The node 200, depicted in a top-down view in FIG. 2(a), is configured to transmit and receive in a substantially planar fashion in four directions. Although nodes may be configured to transmit and receive in more than four directions, this four-direction configuration is preferable, and it will be used in examples throughout this description. The techniques presented can easily be adapted to situations involving more than four directions and to situations in which communication in a three-dimensional volume (as opposed to along a two-dimensional plane) is desired.

As depicted in FIG. 2(a), the node 200 comprises a processing unit 202. The processing unit is depicted in more detail in, and discussed relative to, FIG. 2(b). The processing unit is operative for receiving and manipulating data in order to perform the communication functions presented herein. Typically, the communication functions are performed by software operating within the processing unit 202. However, the functions may conceivably also be hard-coded into the processing unit 202 to enhance performance speed.

In addition to the processing unit 202, the node 200 also includes a directional communication interface 204. The directional communication interface 204 preferably comprises a directional infrared transmitter/receiver operative to transmit and receive in at least one of four possible directions. Any directional communication medium may be utilized with the present invention, including optical (infrared/laser), acoustic, and radio-frequency communications. Although the present invention is preferably operated in a wireless environment, it is also possible for the directional communication interface 204 to be a wired communication interface wherein each direction represents a different line out of the node 200.

The node 200 may also include other devices, for example, sensors or other secondary communications mechanisms. A sensor 206 is depicted on the node of FIG. 2(a), and may be provided in order to allow the node 200 to gather information from its environment for incorporation into a message as it is propagated through a plurality of nodes 200. Any sensor 206, or combination of sensors, may be selected, as desired for a particular environment; non-limiting examples include heat sensors, smoke detectors, chemical detectors, and motion detectors.

A block diagram presenting more details of the processing unit 202 is depicted in FIG. 2(b). As shown, the processing unit 202 of the node 200 includes a processor 208, a memory 210 connected with the processor 208, a directional communication interface 204 connected with the processor 208, and an optional sensor 214 connected with the processor 208. The processing unit 202 serves as a control for the communication requirements of a node 200. Although other systems may be present at the node, including other processors, this processing unit 202 forms the core of the node 200 from the perspective of the present invention. All of the communication functions described herein are controlled by the processor 208, augmented with the memory 210 and facilitated through the use of the directional communication interface 204 and the sensor 214. Although not shown, the processing unit 202 may also include an input/output port for receiving software programs.

In addition to those features shown, it is also possible for the node 200 to incorporate a means for providing mobility. For example, the node could include wheels or legs for ground transportation, fins and a propeller for aquatic transportation, wings and a propeller for aerial transportation, or jets for space-based transportation.

Next, the functions of the present invention will be described along with a flow chart depicting, in FIG. 3, the steps in the method of the present invention at a node. Note that reference to FIG. 1 is also provided in order to provide a better illustrative understanding of the physical processes of the present invention as related to the steps of the method. During the start 300 of the method, the nodes 200 await the reception of a message. A message from a message source 104 is transmitted to a first recipient node 100 among the plurality of nodes 100 in a transmitting step 302. The message may originate from one of the nodes 100, or it may originate outside the plurality of nodes 100. The message, which is re-transmitted among the plurality of nodes, includes an address code and corresponding data (the content of the message). The address code is used to direct the message to at least one intended recipient node 106.

In the preferred two-dimensional embodiment, the address code comprises an (X, Y) value that indicates an offset (a relative target address) from the current node 100 to the intended recipient node 106. The (X, Y) value indicates how many hops to the right (X) and how many hops forward (Y) a message is to be relayed. In this case, the reference frame for "forward" and "right" is defined in terms of the direction of the originating command signal. When a node 100 receives a message from a given direction, either from an external source or from another node 100, re-transmits the message in at least one of three directions, performing a mathematical transformation on the address code for each direction of transmission.

After transmission of the message in the transmitting step 302, the message is received at the next node in a receiving step 304. After the message is received, the node 100 performs a processing step 306 on the received address code to determine whether the address code indicates that the current node 100 is the intended recipient node 106. In the preferred embodiment, the four possible directions are at 90 degree angles to each other, and the message is received from a given direction with a given address code represented by (X, Y). The address code is modified such that when it is to be:

a. transmitted 90 degrees to the left of the direction in which it is received, the modified address code is (Y, −(X+1));
b. transmitted along the same direction (forward) in which it is received, the modified address code is (X, Y−1); and
c. transmitted 90 degrees to the right of the direction in which it is received, the modified address code is (−Y, X−1).

Once the the message is received by a node, the address code is checked to determine whether the current node 100 is the intended recipient node 106. In the preferred embodiment, the mathematical transform results in an address code of (0, 0) at the intended recipient node 106. Other configurations are possible, including allowing one of several possible address codes to indicate intended recipient nodes 106. For example, nodes 100 in an area surrounding the intended recipient node 106 could also act as additional intended recipient nodes 106 so that the message will be received over a local subset of the nodes 100.

Other schemes of designating intended recipient nodes 106 are possible. Another non-limiting example is to designate nodes 100 at different, but known, offsets from a selected node 100 for reception such that a subset of the nodes 100 (not necessarily in the same vicinity) is designated for receiving the message. Using the transform along with the known offsets from the selected node 100 the subset of nodes 100 could be enabled to act as intended recipients.

If the node 100 is the intended recipient node 106, as determined by an intended recipient checking step 308, the re-transmission of the signal may be halted in a receiving message and halting step 310. If the signal is halted because the node 100 is the intended recipient node 106, it is possible that the intended recipient node 106 was essentially a stopping point along a larger transmission. In this case, the intended recipient node 106 may augment the message (possibly to incorporate data from a sensor, etc.) for re-transmission to another intended recipient node 106. If this is the case, another intended recipient node is designated in an intended recipient node designating step 312. If another intended recipient node 106 is designated, the process begins again with the transmitting step 302. If another recipient node 106 is not designated, the transmission ends 314.

If, on the other hand, the node 100 is not the intended recipient node 106, the message is then optionally checked to determine whether it has expired 316. There are many possible techniques for causing the occurrence of message expiration, three of which are discussed next.

A first example includes time-stamping the message when it is initially transmitted 302 and then, in the expiration checking step 316, comparing the time-stamp to the current time prior to re-transmission. If the time-stamp indicates that the message has aged sufficiently (e.g., the difference between the time-stamp and the current time is sufficiently large), then a halting step 318 may occur, and the transmission ends 314. Thus, with this method, messages propagate through a plurality of nodes 100 for a predetermined amount of time before they expire and their transmission halts.

A second example of a possible technique for causing the occurrence of message expiration is through the use of a cumulative hop count. When the message is initially transmitted 302, a hop counter in the message is initialized to an initial value. As it is re-transmitted by the nodes, its hop counter is incremented or decremented prior to each re-transmission. The message is set to expire (its transmission halt) after a predetermined number of hops through the nodes. In the expiration checking step 316, the hop count is compared to a hop count threshold that determines message expiration. If the hop count exceeds (or is less than—in the case of a decrementing version of the hop count) the hop count threshold, then further transmission of the message from that node may be prohibited in a halting step 318, and the transmission ends 314. Thus, with this method, messages propagate through the plurality of nodes 100 for a predetermined number of hops before they expire and their transmission halts.

A final example of a possible technique for causing the occurrence of message expiration is through the use of a unique message identifier. In this method, when the message is initially transmitted 302, a unique message identifier is included in the message. As messages are re-transmitted through the plurality of nodes 100, the nodes 100 collect the unique message identifiers for comparison with later received messages. The nodes 100 check and record the unique identifiers of messages to determine whether the unique identifier of a given message matches one previously stored (indicated that the same message has been transmitted to the node 100 in the past). If the unique identifier for a message matches one previously stored, then further transmission of the message from that node may be prohibited in a halting step 318, and the transmission ends 314. Thus, with this method, messages may propagate through the entire plurality of nodes 100 before they expire and their transmission halts.

Although three mechanisms for expiring messages are discussed above, many other methods are readily conceivable as well as combinations of those above.

If the message has not expired 316, then the data of the message may be processed or modified in an optional data processing/modifying step 320. For example, nodes 100 may incorporate local data into the data of the message as it is transmitted along a particular path. Thus, the message may contain cumulative data along a path. This cumulative data may contain information from sensors, information inserted by a local user, etc.

Also, the system may be configured such that data is only accumulated at nodes 100 designated as intended recipient nodes 106, such that the system may be programmed to collect data at certain points as a message travels across a network of nodes. An example of a mechanism for facilitating this process is to add a fixed offset in the data of the message and to use that fixed offset to reset the address code of the message each time it reaches an intended recipient node 106. At that point, the intended recipient node could be commanded to collect data for re-transmission. In this sense, at least a portion the data in the message can act as a command signal.

Figure 4:
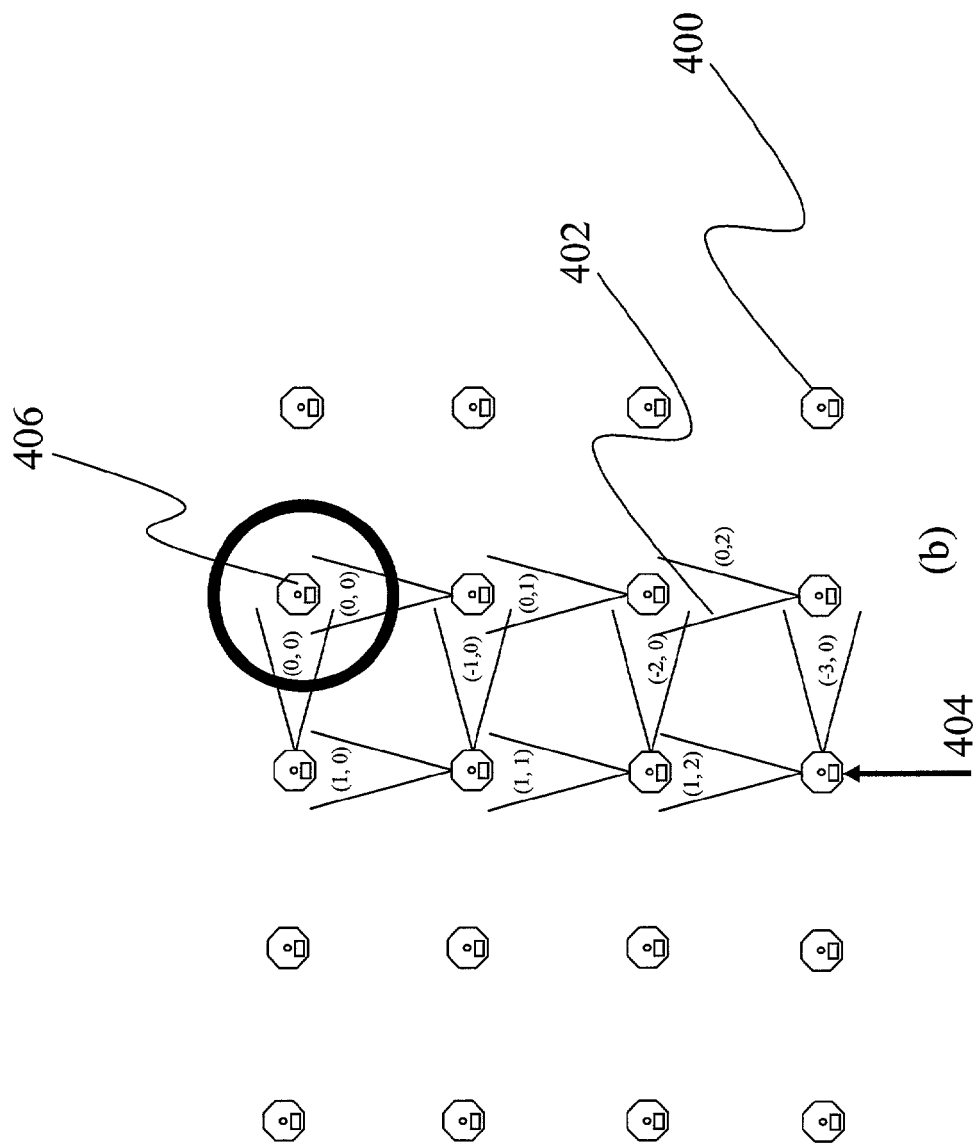
FIG. 4(a) is an illustrative diagram depicting a direction code transform for the case of planar, 4-directional communication.
FIG. 4(b) is an illustrative diagram depicting a plurality of nodes communicating in a two-dimensional communication array.

After the optional data processing/modifying step 320, another optional step is performed to determine the directions in which to re-transmit the message 322. In this step, the directions in which re-transmission is desired may be determined in several possible ways. For example, the address code or the data portion of the message may contain information indicative of a direction in which the message should always be re-transmitted. Information regarding the direction in which the message should be re-transmitted may also be derived by processing the address code. In particular, selective re-transmission of a message may be desired to ensure that the message always propagates toward the intended recipient node 106. Since the address code represents an offset from the current node 100 to the intended recipient node 106, it is possible to (within a 90 degree arc in the preferred embodiment using planar transmission in four directions) limit transmission to two directions. This helps to conserve power and to conserve network resources. This embodiment is depicted in FIG. 4, along with the directional message transform, as described below. Note that for best results with the communication techniques of the present invention, it is desirable that the nodes be distributed/spaced somewhat evenly over their area of coverage.

Figure 3:
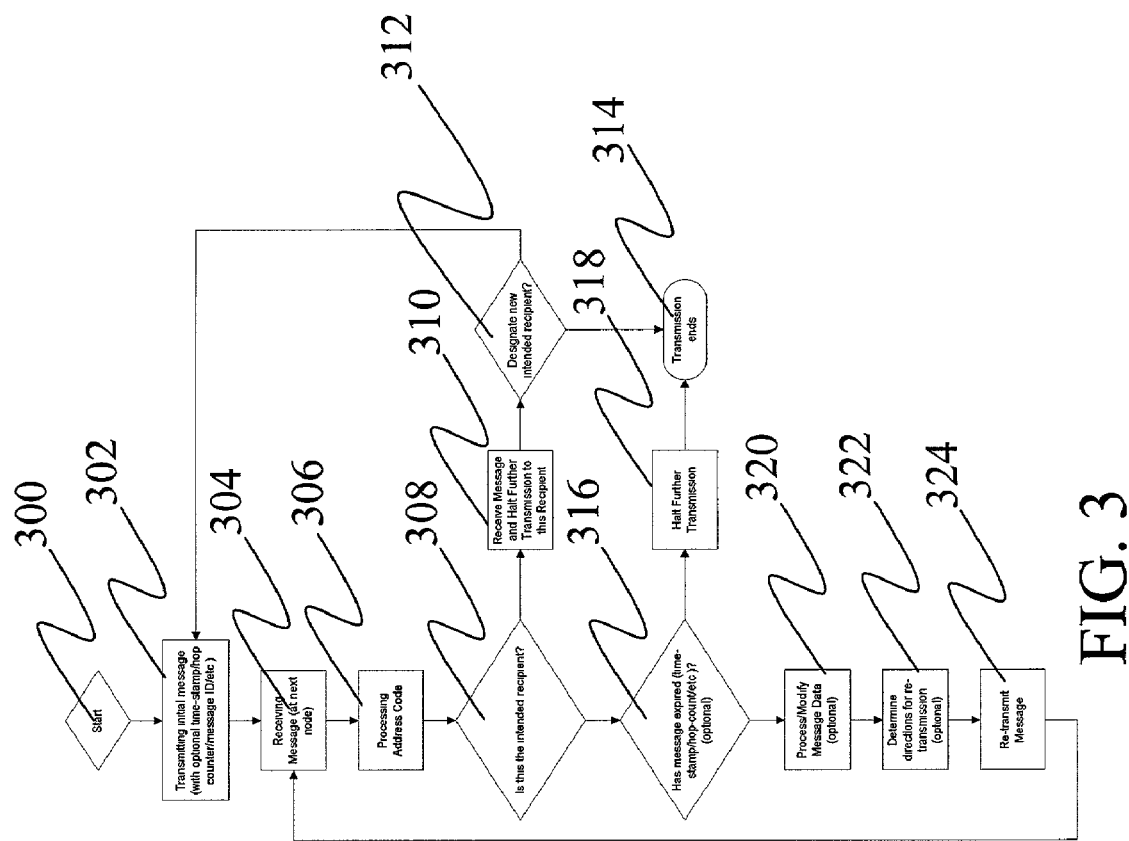
FIG. 3 is a flow chart depicting the steps in the method of the present invention.

Continuing with the discussion of FIG. 3, after (optionally) determining the directions in which to re-transmit the signal 322, the message is re-transmitted in a re-transmitting step 324, where the transmission in each unique direction contains the address code computed for that direction as determined from the address transformation 306. The propagation of the message continues with receiving the message 304 again at the next node(s) to which the message was transmitted.

FIG. 4(a) is an illustrative diagram depicting a direction code transform as previously described for the case of planar, 4-directional communication. The illustration of the transform assumes that the incoming signal is received from the left with an address code (X, Y). The other (transformed), outgoing signals contain transformed address codes based on the incoming direction. Regardless of the incoming direction in this embodiment, the illustration need only be rotated to reflect the proper incoming signal direction, and the outgoing results are the same relative to that direction (e.g., if the message is received from the bottom of the diagram, then the illustration need only be rotated (as a whole) 90 degrees to the left to accommodate this situation).

FIG. 4(b) is an illustrative diagram depicting a plurality of nodes communicating in a two-dimensional communication array. In this embodiment, note that the nodes 400 only transmit signals 402 from the signal origin 404 in a direction toward the intended recipient node 406. Note also that sample address codes are provided in the figure to help illustrate the transform.

In other embodiments, such as the three-dimensional embodiment or in embodiments using more or less than four directions, or where the directions of transmission vary from being normal to each other, the transform must be modified. Modification of the transform for these cases generally requires routine mathematical modification (trigonometry) only.

In production, the present invention may comprise a plurality of nodes produced together and used together as a single item. On the other hand, it may comprise a single node configured for use with other nodes to form a network of nodes as described herein. In another embodiment, the present invention takes the form of a computer program product recorded on a recording medium.

Figure 5:
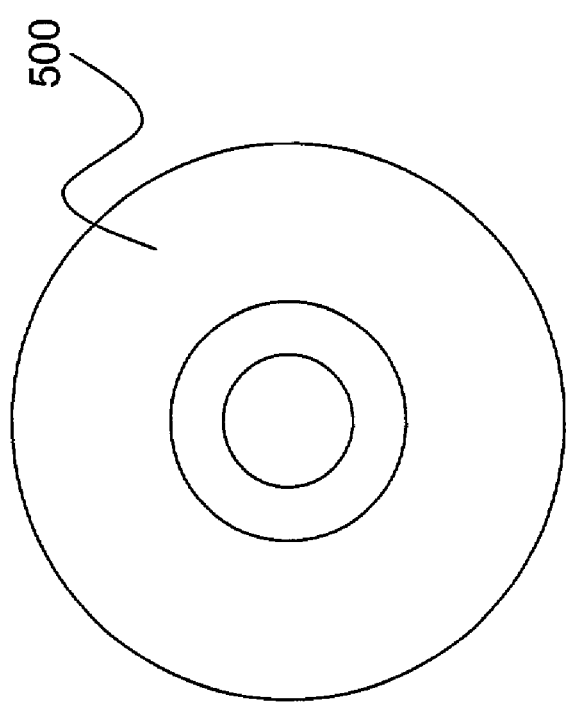
FIG. 5 is an illustration of a computer readable recording medium used in conjunction with the present invention.

A disc, shown in FIG. 5, represents a recording medium 500 such as a compact disc (CD) or a digital versatile disc (DVD). Although depicted as a CD or DVD, any recording medium could be utilized, examples of which include magnetic discs and tapes, and other optical storage medium.

There are many potential applications for the invention described herein, examples of which include distributed sensor networks, smart mines, nano satellites, and distributed robots where a large number of locally networked nodes need to coordinate and share information. In these situations, where it is often impractical to provide each node with a means to determine its position accurately, such as GPS, the present invention is advantageous.

The preferred embodiment of the present invention contemplates a large number of simple robots that are capable of communicating with each other over a relatively short range using simple optical links. When a user wishes to send a command to a particular robot at a particular location, there is no way to refer to that robot other than by its distance and direction relative to the user. This is because the robots contemplated have no on-board position location means, and there is no way for the user to know the particular identity of the robot they wish to command.

These features and embodiments of the present invention are also set forth in claims that follow.

What is claimed is:

1. A method for messaging within a plurality of nodes, wherein each of the nodes includes a processor, a memory connected with the processor, and a directional communication interface, the method comprising: a. receiving a message including an address code and corresponding data at a current node among the plurality of nodes, the address code including a relative target address of the node to which the corresponding message is intended to be sent; b. processing the received address code to determine if the address code indicates that the current node is the intended recipient of the message; c. modifying the message based on the direction from which the message was received, the address code in the message, and the direction to which the message is to be re-transmitted; d. re-transmitting the message including the modified address code, in each direction in which it is to be re-transmitted; and e. repeating steps a to d at every node until the message reaches the node to which the message is intended to be sent, whereby a message may be propagated across a plurality of nodes along multiple paths until the message reaches a desired recipient, thereby providing path redundancy without the need for the use of unique node identities;

further including a step of initializing a cumulative hop count in the message when it is initially transmitted, a step of incrementing or decrementing the hop-count each time the message is re-transmitted, and a step of halting the re-transmission of the message when the hop-count reaches a predetermined level, whereby messages propagate through the plurality of nodes for a pre-specified number of hops and then are no-longer re-transmitted regardless whether they reach the node to which they were intended to be sent.

2. A method for messaging within a plurality of nodes, wherein each of the nodes includes a processor, a memory connected with the processor, and a directional communication interface, the method comprising: a. receiving a message including an address code and corresponding data at a current node among the plurality of nodes, the address code including a relative target address of the node to which the corresponding message is intended to be sent; b. processing the received address code to determine if the address code indicates that the current node is the intended recipient of the message; c. modifying the message based on the direction from which the message was received, the address code in the message, and the direction to which the message is to be re-transmitted; d. re-transmitting the message including the modified address code, in each direction in which it is to be re-transmitted; and e. repeating steps a to d at every node until the message reaches the node to which the message is intended to be sent, whereby a message may be propagated across a plurality of nodes along multiple paths until the message reaches a desired recipient, thereby providing path redundancy without the need for the use of unique node identities;

further including a step of providing a unique identifier the message when it is initially transmitted, a step of checking and recording the unique identifier of the message at each node to determine whether the unique identifier of the message matches one previously stored, and a step of halting the re-transmission of the message if the unique identifier of the message matches one previously stored, whereby messages propagate through the plurality of nodes only once.

3. A method for messaging within a plurality of nodes, wherein each of the nodes includes a processor, a memory connected with the processor, and a directional communication interface, the method comprising: a. receiving a message including an address code and corresponding data at a current node among the plurality of nodes, the address code including a relative target address of the node to which the corresponding message is intended to be sent; b. processing the received address code to determine if the address code indicates that the current node is the intended recipient of the message; c. modifying the message based on the direction from which the message was received, the address code in the message, and the direction to which the message is to be re-transmitted; d. re-transmitting the message including the modified address code, in each direction in which it is to be re-transmitted; and e. repeating steps a to d at every node until the message reaches the node to which the message is intended to be sent, whereby a message may be propagated across a plurality of nodes along multiple paths until the message reaches a desired recipient, thereby providing path redundancy without the need for the use of unique node identities;

further including the optional step of modifying the data of the message at a node prior to re-transmission, whereby the message may accumulate information as it propagates to the intended recipient; and wherein a portion of the nodes include at least one sensor for generating sensor information, and wherein in the step of modifying the data, sensor information may be used to modify the data of the message prior to re-transmission.

4. A method for messaging within a plurality of nodes as set forth in claim 3, wherein when the message reaches the node to which the message is intended to be sent, a step of designating a new node to which the message is intended to be sent and wherein the message is propagated to the new node by repeating steps a–e, whereby a message may be sequentially transmitted to multiple intended recipients.

5. A method for messaging within a plurality of nodes as set forth in claim 4, wherein each time the message reaches a node to which the message is intended to be sent, a step of modifying the address code of the message to indicate a new node to which the message is intended to be sent is performed, and an optional step modifying the data of the message may be performed.

6. A method for messaging within a plurality of nodes, wherein each of the nodes includes a processor, a memory connected with the processor, and a directional communication interface, the method comprising: a. receiving a message including an address code and corresponding data at a current node among the plurality of nodes, the address code including a relative target address of the node to which the corresponding message is intended to be sent; b. processing the received address code to determine if the address code indicates that the current node is the intended recipient of the message; c. modifying the message based on the direction from which the message was received, the address code in the message, and the direction to which the message is to be re-transmitted; d. re-transmitting the message including the modified address code, in each direction in which it is to be re-transmitted; and e. repeating steps a to d at every node until the message reaches the node to which the message is intended to be sent, whereby a message may be propagated across a plurality of nodes along multiple paths until the message reaches a desired recipient, thereby providing path redundancy without the need for the use of unique node identities;

wherein the re-transmitting of the message across the plurality of nodes occurs in a two-dimensional plane;

wherein each of the nodes transmits and receives in four possible directions; and wherein the four possible directions are at 90 degree angles to each other and wherein a message is received from a direction represented by $(X, Y)$, and wherein the address code is modified in the modifying step such that when it is: a. transmitted 90 degrees to the left of the direction in which it is received, the modified address code is $(Y, -(X+1))$; b. transmitted along the same direction in which it is received, the modified address code is $(X, Y-1)$; and c. transmitted 90 degrees to the right of the direction in which it is received, the modified address code is $(-Y, X-1)$.

7. A method for messaging within a plurality of nodes as set forth in claim 6, further including a step of time-stamping the message when it is initially transmitted, and a step of comparing the time-stamp to a current time at each node prior to re-transmission, a step of halting the re-transmitting of the message after a predetermined amount of time has elapsed since the step of time-stamping the message occurred, whereby messages propagate through the plurality of nodes for a pre-specified amount of time and then are no-longer re-transmitted regardless whether they reach the node to which they were intended to be sent.

8. A method for messaging within a plurality of nodes as set forth in claim 7, wherein the multiple nodes among the plurality nodes near the node to which the message is intended to be sent may also be indicated as intended recipients of the message, whereby the selected nodes cover an area within the plurality of nodes.

9. A method for messaging within a plurality of nodes as set forth in claim 6, further including a step of initializing a cumulative hop count in the message when it is initially transmitted, a step of incrementing or decrementing the hop-count each time the message is re-transmitted, and a step of halting the re-transmission of the message when the hop-count reaches a predetermined level, whereby messages propagate through the plurality of nodes for a pre-specified number of hops and then are no-longer re-transmitted regardless whether they reach the node to which they were intended to be sent.

10. A method for messaging within a plurality of nodes as set forth in claim 6, further including a step of providing a unique identifier in the message when it is initially transmitted, a step of checking and recording the unique identifier of the message at each node to determine whether the unique identifier of the message matches one previously stored, and a step of halting the re-transmission of the message if the unique identifier of the message matches one previously stored, whereby the messages propagate through the plurality of nodes only once.

11. A method for messaging within a plurality of nodes as set forth in claim 6, wherein multiple nodes among the plurality of nodes may be indicated as intended recipients of the message, whereby a message may be targeted at selected nodes among the plurality of nodes.

12. A method for messaging within a plurality of nodes as set forth in claim 6, wherein in the step of re-transmitting the message, the message is re-transmitted only in a subset of directions determined from the address code in the message and the direction from which the message was received.

13. A method for messaging within a plurality of nodes as set forth in claim 6, wherein the in the step of re-transmitting the message, the message is re-transmitted only in directions which result in re-transmission toward the node to which the message is intended to be sent, whereby the propagation of the message always occurs toward the intended recipient.

14. A method for messaging within a plurality of nodes as set forth in claim 6, further including the optional step of modifying the data of the message at a node prior to re-transmission, whereby the message may accumulate information as it propagates to the intended recipient.

15. A method for messaging within a plurality of nodes as set forth in claim 14, wherein a portion of the nodes include at least one sensor for generating sensor information, and wherein in the step of modifying the data, sensor information may be used to modify the data of the message prior to re-transmission.

16. A method for messaging within a plurality of nodes as set forth in claim 15, wherein when the message reaches the node to which the message is intended to be sent, a step of designating a new node to which the message is intended to be sent and wherein the message is propagated to the new node by repeating steps a–e, whereby a message may be sequentially transmitted to multiple intended recipients.

17. A method for messaging within a plurality of nodes as set forth in claim 6, wherein the data of the message is a command.

18. A method for messaging within a plurality of nodes as set forth in claim 6, where at least a portion of the nodes is mobile.

19. A system for directed communication within a data network, the network comprising a plurality of nodes, each comprising a processor, a memory connected with the processor, and a directional communication interface connected with the processor, the processor and memory include: a. means for receiving a message via the communication interface and providing the message to the processor and memory, the message including an address code and corresponding data, the address code including a relative target address of a node to which the corresponding message is intended to be sent; b. means for determining if the address code indicates that the node receiving the message is the intended recipient of the message; c. means for modifying the message based on the direction from which the message was received, the address code in the message, and the direction to which the message is to be re-transmined; d. means re-transmitting the message via the directional communication interface, including the modified address code, in each direction in which it is to be re-transmitted; whereby a message may be propagated across the plurality of nodes until the message reaches the node to which the message is intended to be sent, and a message may be propagated across a plurality of nodes along multiple paths until the message reaches a desired recipient, thereby providing path redundancy without the need for the use of unique node identities; and wherein the processor and memory of each node further include a means for initializing a cumulative hop count in the message when it is initially transmitted, a means for incrementing or decrementing the hop-count each time the message is re-transmitted, and a means for halting the re-transmission of the message when the hop-count reaches a predetermined level, whereby messages propagate through the plurality of nodes for a pre-specified number of hops and then are no-longer re-transmitted regardless whether they reach the node to which they were intended to be sent.

20. A system for directed communication within a data network, the network comprising a plurality of nodes, each comprising a processor, a memory connected with the processor, and a directional communication interface connected with the processor, the processor and memory include: a. means for receiving a message via the communication interface and providing the message to the processor and memory, the message including an address code and corresponding data, the address code including a relative target address of a node to which the corresponding message is intended to be sent; b. means for determining if the address code indicates that the node receiving the message is the intended recipient of the message; c. means for modifying the message based on the direction from which the message was received, the address code in the message, and the direction to which the message is to be re-transmitted; d. means re-transmitting the message via the directional communication interface, including the modified address code, in each direction in which it is to be re-transmitted; whereby a message may be propagated across the plurality of nodes until the message reaches the node to which the message is intended to be sent, and a message may be propagated across a plurality of nodes along multiple paths until the message reaches a desired recipient, thereby providing path redundancy without the need for the use of unique node identities; and wherein the processor and memory of each node further include a means for providing a unique identifier for the message when it is initially transmitted, a means for checking and recording the unique identifier of the message at each node to determine whether the unique identifier of the message matches one previously stored, and a means for halting the re-transmission of the message if the unique identifier of the message matches one previously stored, whereby the messages propagate through the plurality of nodes only once.

21. A system for directed communication within a data network, the network comprising a plurality of nodes, each comprising a processor, a memory connected with the processor, and a directional communication interface connected with the processor, the processor and memory include: a. means for receiving a message via the communication interface and providing the message to the processor and memory, the message including an address code and corresponding data, the address code including a relative target address of a node to which the corresponding message is intended to be sent; b. means for determining if the address code indicates that the node receiving the message is the intended recipient of the message; c. means for modifying the message based on the direction from which the message was received, the address code in the message, and the direction to which the message is to be re-transmitted; d. means re-transmitting the message via the directional communication interface, including the modified address code, in each direction in which it is to be re-transmitted; whereby a message may be propagated across the plurality of nodes until the message reaches the node to which the message is intended to be sent, and a message may be propagated across a plurality of nodes along multiple paths until the message reaches a desired recipient, thereby providing path redundancy without the need for the use of unique node identities; and wherein the processor and memory of each node further include a means for modifying the data of the message at a node prior to re-transmission, whereby the message may accumulate information as it propagates to the intended recipient.

22. A system for directed communication within a data network as set forth in claim 21, wherein a portion of the nodes include at least one sensor for generating sensor information, and wherein the means for modifying the data uses the sensor information to modify the data of the message prior to re-transmission.

23. A system for directed communication within a data network as set forth in claim 22, wherein when the message reaches the node to which the message is intended to be sent, a new node may be designated as the node to which the message is intended to be sent, and wherein the message is propagated to the new node, whereby a message may be sequentially transmitted to multiple intended recipients.

24. A system for directed communication within a data network as set forth in claim 22, wherein when the message reaches the node to which the message is intended to be sent, a new node may be designated as the node to which the message is intended to be sent, and wherein the message is propagated to the new node, whereby a message may be sequentially transmitted to multiple intended recipients.

25. A system for directed communication within a data network as set forth in claim 23, wherein each time the message reaches a node to which the message is intended to be sent, the address code of the message is modified by the processor of the node to indicate a new node to which the message is intended to be sent is performed.

26. A system for directed communication within a data network as set forth in claim 23, wherein each time the message reaches a node to which the message is intended to be sent, the address code of the message is modified by the processor of the node to indicate a new node to which the message is intended to be sent is performed.

27. A system for directed communication within a data network as set forth in claim 21, wherein a portion of the nodes include at least one sensor for generating sensor information, and wherein the means for modifying the data uses the sensor information to modify the data of the message prior to re-transmission.

28. A system for directed communication within a data network, the network comprising a plurality of nodes, each comprising a processor, a memory connected with the processor, and a directional communication interface connected with the processor, the processor and memory include: a. means for receiving a message via the communication interface and providing the message to the processor and memory, the message including an address code and corresponding data, the address code including a relative target address of a node to which the corresponding message is intended to be sent; b. means for determining if the address code indicates that the node receiving the message is the intended recipient of the message; c. means for modifying the message based on the direction from which the message was received, the address code in the message, and the direction to which the message is to be re-transmitted; d. means re-transmitting the message via the directional communication interface, including the modified address code, in each direction in which it is to be re-transmitted; whereby a message may be propagated across the plurality of nodes until the message reaches the node to which the message is intended to be sent, and a message may be propagated across a plurality of nodes along multiple paths until the message reaches a desired recipient, thereby providing path redundancy without the need for the use of unique node identities;

wherein the nodes are configured to re-transmit the message in a two-dimensional plane; and wherein the four possible directions are at 90 degree angles to each other and wherein a message is received from a direction represented by (X, Y), and wherein the address code is modified by the means for modifying such that when it is: a. transmitted 90 degrees to the left of the direction in which it is received, the modified address code is (Y, −(X+1)); b. transmitted along the same direction in which it is received, the modified address code is (X, Y−1); and c. transmitted 90 degrees to the right of the direction in which it is received, the modified address code is (−Y, X−1).

29. A system for directed communication within a data network as set forth in claim 28, wherein the processor and memory of each node further include a means for time-stamping the message when it is initially transmitted, a means for comparing the time-stamp to a current time at each node prior to re-transmission, and a means for halting the re-transmitting of the message after a predetermined amount of time has elapsed since the time-stamping of the message occurred, whereby messages propagate through the plurality of nodes for a pre-specified amount of time and then are no-longer re-transmitted regardless of whether they reach the node to which they were intended to be sent.

30. A system for directed communication within a data network as set forth in claim 28, wherein the processor and memory of each node further include a means for initializing a cumulative hop count in the message when it is initially transmitted, a means for incrementing or decrementing the hop-count each time the message is re-transmitted, and a means for halting the re-transmission of the message when the hop-count reaches a predetermined level, whereby messages propagate through the plurality of nodes for a pre-specified number of hops and then are no-longer re-transmitted regardless whether they reach the node to which they were intended to be sent.

31. A system for directed communication within a data network as set forth in claim 28, wherein the processor and memory of each node further include a means for providing a unique identifier for the message when it is initially transmitted, a means for checking and recording the unique identifier of the message at each node to determine whether the unique identifier of the message matches one previously stored, and a means for halting the re-transmission of the message if the unique identifier of the message matches one previously stored, whereby the messages propagate through the plurality of nodes only once.

32. A system for directed communication within a data network as set forth in claim 28, wherein multiple nodes among the plurality of nodes may be indicated as intended recipients of the message, whereby a message may be targeted at selected nodes among the plurality of nodes.

33. A system for directed communication within a data network as set forth in claim 32, wherein the multiple nodes among the plurality nodes near the node to which the message is intended to be sent may also be indicated as intended recipients of the message, whereby the selected nodes cover an area within the plurality of nodes.

34. A system for directed communication within a data network as set forth in claim 28, wherein when the message is re-transmitted, it is re-transmitted only in directions determined from the address code in the message.

35. A system for directed communication within a data network as set forth in claim 28, the message is re-transmitted through the plurality of nodes only in directions which result in re-transmission toward the node to which the message is intended to be sent, whereby the propagation of the message always occurs toward the intended recipient.

36. A system for directed communication within a data network as set forth in claim 28, wherein the data of the messages are commands.

37. A system for directed communication within a data network as set forth in claim 28, wherein at least a portion of the nodes is mobile.

38. A node for communication within a system for directed communication within a data network, the node comprising a processor, a memory connected with the processor, and a directional communication interface connected with the processor, the processor and memory include: a. means for receiving a message via the communication interface and providing the message to the processor and memory, the message including an address code and corresponding data, the address code including a relative target address of a node to which the corresponding message is intended to be sent; b. means for determining if the address code indicates that the node receiving the message is the intended recipient of the message; c. means for modifying the message based on the direction from which the message was received, the address code in the message, and the direction to which the message is to be re-transmitted; d. means re-transmitting the message via the directional communication interface, including the modified address code, in each direction in which it is to be re-transmitted; whereby a message may be propagated across the plurality of nodes until the message reaches the node to which the message is intended to be sent, and a message may be propagated across a plurality of nodes along multiple paths until the message reaches a desired recipient, thereby providing path redundancy without the need for the use of unique node identities; and wherein the processor and memory the node further includes a means for initializing a cumulative hop count in the message when it is initially transmitted from that node, a means for incrementing or decrementing the hop-count each time a message is re-transmitted from the node, and a means for halting the re-transmission of the message when the hop-count reaches a predetermined level at the node, whereby messages propagate through a plurality of nodes for a pre-specified number of hops and then are no-longer re-transmitted regardless whether they reach the node to which they were intended to be sent.

39. A node for communication within a system for directed communication within a data network, the node comprising a processor, a memory connected with the processor, and a directional communication interface connected with the processor, the processor and memory include: a. means for receiving a message via the communication interface and providing the message to the processor and memory, the message including an address code and corresponding data, the address code including a relative target address of a node to which the corresponding message is intended to be sent; b. means for determining if the address code indicates that the node receiving the message is the intended recipient of the message; c. means for modifying the message based on the direction from which the message was received, the address code in the message, and the direction to which the message is to be re-transmitted; d. means re-transmitting the message via the directional communication interface, including the modified address code, in each direction in which it is to be re-transmitted; whereby a message may be propagated across the plurality of nodes until the message reaches the node to which the message is intended to be sent, and a message may be propagated across a plurality of nodes along multiple paths until the message reaches a desired recipient, thereby providing path redundancy without the need for the use of unique node identities; and wherein the processor and memory, the node further includes a means for providing a unique identifier for the message when it is initially transmitted, a means for checking and recording the unique identifier of the message at the node to determine whether the unique identifier of the message matches one previously stored, and a means for halting the re-transmission of the message if the unique identifier of the message matches one previously stored, whereby the messages propagate through a plurality of nodes only once.

40. A node for communication within a system for directed communication within a data network, the node comprising a processor, a memory connected with the processor, and a directional communication interface connected with the processor, the processor and memory include: a. means for receiving a message via the communication interface and providing the message to the processor and memory, the message including an address code and corresponding data, the address code including a relative target address of a node to which the corresponding message is intended to be sent; b. means for determining if the address code indicates that the node receiving the message is the intended recipient of the message; c. means for modifying the message based on the direction from which the message was received, the address code in the message, and the direction to which the message is to be re-transmitted; d. means re-transmitting the message via the directional communication interface, including the modified address code, in each direction in which it is to be re-transmitted; whereby a message may be propagated across the plurality of nodes until the message reaches the node to which the message is intended to be sent, and a message may be propagated across a plurality of nodes along multiple paths until the message reaches a desired recipient, thereby providing path redundancy without the need for the use of unique node identities; and wherein the processor and memory of the node further includes a means for modifying the data of the message at a node prior to re-transmission, whereby the message may accumulate information as it propagates to the intended recipient node across a plurality of nodes.

41. A node for communication within a system for directed communication within a data network as set forth in claim 40, wherein the node includes at least one sensor for generating sensor information, and wherein the means for modifying the data uses the sensor information to modify the data of the message prior to re-transmission.

42. A node for communication within a system for directed communication within a data network, the node comprising a processor, a memory connected with the processor, and a directional communication interface connected with the processor, the processor and memory include: a. means for receiving a message via the communication interface and providing the message to the processor and memory, the message including an address code and corresponding data, the address code including a relative target address of a node to which the corresponding message is intended to be sent; b. means for determining if the address code indicates that the node receiving the message is the intended recipient of the message; c. means for modifying the message based on the direction from which the message was received, the address code in the message, and the direction to which the message is to be re-transmitted; d. means re-transmitting the message via the directional communication interface, including the modified address code, in each direction in which it is to be re-transmitted; whereby a message may be propagated across the plurality of nodes until the message reaches the node to which the message is intended to be sent, and a message may be propagated across a plurality of nodes along multiple paths until the message reaches a desired recipient, thereby providing path redundancy without the need for the use of unique node identities;

wherein the node is configured to re-transmit the message in a two-dimensional plane;

wherein the node is configured to transmit and receive in four possible direction;

wherein the four possible directions are at 90 degree angles to each other and wherein a message is received from a direction represented by (X, Y), and wherein the address code is modified by the means for modifying such that when it is: a. transmitted 90 degrees to the left of the direction in which it is received, the modified address code is (Y, −(X+1)); b. transmitted along the same direction in which it is received, the modified address code is (X, Y−1); and c. transmitted 90 degrees to the right of the direction in which it is received, the modified address code is (−Y, X−1).

43. A node for communication within a system for directed communication within a data network as set forth in claim 42, wherein when the message is re-transmitted, it is re-transmitted only in a subset of directions determined from the address code in the message and the direction from which the message was received.

44. A node for communication within a system for directed communication within a data network as set forth in claim 42, wherein when the message is re-transmitted boy the node, it is only re-transmitted in directions which result in re-transmission toward a node to which the message is intended to be sent, whereby the propagation of the message always occurs toward an intended recipient.

45. A node for communication within a system for directed communication within a data network as set forth in claim 42, wherein the processor and memory of the node further includes a means for modifying the data of the message at a node prior to re-transmission, whereby the message may accumulate information as it propagates to the intended recipient node across a plurality of nodes.

46. A node for communication within a system for directed communication within a data network as set forth in claim 42, wherein the data of the messages are commands.

47. A node for communication within a system for directed communication within a data network as set forth in claim 42, wherein the node is mobile.

48. A node for communication within a system for directed communication within a data network, the node comprising a processor, a memory connected with the processor, and a directional communication interface connected with the processor, the processor and memory include: a. means for receiving a message via the communication interface and providing the message to the processor and memory, the message including an address code and corresponding data, the address code including a relative target address of a node to which the corresponding message is intended to be sent; b. means for determining if the address code indicates that the node receiving the message is the intended recipient of the message; c. means for modifying the message based on the direction from which the message was received, the address code in the message, and the direction to which the message is to be re-transmitted; d. means re-transmitting the message via the directional communication interface, including the modified address code, in each direction in which it is to be re-transmitted; whereby a message may be propagated across the plurality of nodes until the message reaches the node to which the message is intended to be sent, and a message may be propagated across a plurality of nodes along multiple paths until the message reaches a desired recipient, thereby providing path redundancy without the need for the use of unique node identities;

wherein the processor and memory the node further includes a means for initializing a cumulative hop count in the message when it is initially transmitted from that node, a means for incrementing or decrementing the hop-count each time a message is re-transmitted from the node, and a means for halting the re-transmission of the message when the hop-count reaches a predetermined level at the node, whereby messages propagate through a plurality of nodes for a pre-specified number of hops and then are no-longer re-transmitted regardless whether they reach the node to which they were intended to be sent.

49. A node for communication within a system for directed communication within a data network, the node comprising a processor, a memory connected with the processor, and a directional communication interface connected with the processor, the processor and memory include: a. means for receiving a message via the communication interface and providing the message to the processor and memory, the message including an address code and corresponding data, the address code including a relative target address of a node to which the corresponding message is intended to be sent; b. means for determining if the address code indicates that the node receiving the message is the intended recipient of the message; c. means for modifying the message based on the direction from which the message was received, the address code in the message, and the direction to which the message is to be re-transmitted; d. means re-transmitting the message via the directional communication interface, including the modified address code, in each direction in which it is to be re-transmitted; whereby a message may be propagated across the plurality of nodes until the message reaches the node to which the message is intended to be sent, and a message may be propagated across a plurality of nodes along multiple paths until the message reaches a desired recipient, thereby providing path redundancy without the need for the use of unique node identities;

wherein the processor and memory, the node further includes a means for providing a unique identifier for the message when it is initially transmitted, a means for checking and recording the unique identifier of the message at the node to determine whether the unique identifier of the message matches one previously stored, and a means for halting the re-transmission of the message if the unique identifier of the message matches one previously stored, whereby the messages propagate through a plurality of nodes only once.

50. A computer program product for facilitating messaging within a plurality of nodes, with each node having a processor, a memory connected with the processor, and a directional communication interface, the computer program product comprising: a. a recording medium; b. means, recorded on the recording medium for facilitating reception of a message via the communication interface and providing the message to the processor and memory, the message including an address code and corresponding data, the address code including a relative target address of a node to which the corresponding message is intended to be sent; c. means, recorded on the recording medium for facilitating determination whether the address code in a received message indicates that the node receiving the message is the intended recipient of the message; d. means, recorded on the recording medium for modifying the message based on the direction from which the message was received, the address code in the message, and the direction to which the message is to be re-transmitted; and e. means, recorded on the recording medium for facilitating the re-transmission of the message via the directional communication interface, including the modified address code, in each direction in which it is to be re-transmitted; whereby a message may be propagated across the plurality of nodes until the message reaches the node to which the message is intended to be sent, and a message may be propagated across a plurality of nodes along multiple paths until the message reaches a desired recipient, thereby providing path redundancy without the need for the use of unique node identities; and further including means, recorded on the recording medium, for initializing a cumulative hop count in the message when it is initially transmitted from that node; means, recorded on the recording medium, for incrementing or decrementing the hop-count each time a message is re-transmitted from the node; and means, recorded on the recording medium, for halting the re-transmission of the message when the hop-count reaches a predetermined level at the node, whereby messages propagate through a plurality of nodes for a pre-specified number of hops and then are no-longer re-transmitted regardless whether they reach the node to which they were intended to be sent.

51. A computer program product for facilitating messaging within a plurality of nodes, with each node having a processor, a memory connected with the processor, and a directional communication interface, the computer program product comprising: a. a recording medium; b. means, recorded on the recording medium for facilitating reception of a message via the communication interface and providing the message to the processor and memory, the message including an address code and corresponding data, the address code including a relative target address of a node to which the corresponding message is intended to be sent; c. means, recorded on the recording medium for facilitating determination whether the address code in a received message indicates that the node receiving the message is the intended recipient of the message; d. means, recorded on the recording medium for modifying the message based on the direction from which the message was received, the address code in the message, and the direction to which the message is to be re-transmitted; and e. means, recorded on the recording medium for facilitating the re-transmission of the message via the directional communication interface, including the modified address code, in each direction in which it is to be re-transmitted; whereby a message may be propagated across the plurality of nodes until the message reaches the node to which the message is intended to be sent, and a message may be propagated across a plurality of nodes along multiple paths until the message reaches a desired recipient, thereby providing path redundancy without the need for the use of unique node identities; and further including means, recorded on the recording medium, for providing a unique identifier for the message when it is initially transmitted; means, recorded on the recording medium, for checking and recording the unique identifier of the message at the node and determining whether the unique identifier of the message matches one previously stored; and means, recorded on the recording medium, for halting the re-transmission of the message if the unique identifier of the message matches one previously stored, whereby the messages propagate through a plurality of nodes only once.

52. A computer program product for facilitating messaging within a plurality of nodes, with each node having a processor, a memory connected with the processor, and a directional communication interface, the computer program product comprising: a. a recording medium; b. means, recorded on the recording medium for facilitating reception of a message via the communication interface and providing the message to the processor and memory, the message including an address code and corresponding data, the address code including a relative target address of a node to which the corresponding message is intended to be sent; c. means, recorded on the recording medium for facilitating determination whether the address code in a received message indicates that the node receiving the message is the intended recipient of the message; d. means, recorded on the recording medium for modifying the message based on the direction from which the message was received, the address code in the message, and the direction to which the message is to be re-transmitted; and e. means, recorded on the recording medium for facilitating the re-transmission of the message via the directional communication interface, including the modified address code, in each direction in which it is to be re-transmitted; whereby a message may be propagated across the plurality of nodes until the message reaches the node to which the message is intended to be sent, and a message may be propagated across a plurality of nodes along multiple paths until the message reaches a desired recipient, thereby providing path redundancy without the need for the use of unique node identities; and further including means, recorded on the recording medium, for modifying the data of the message at a node prior to re-transmission, whereby the message may accumulate information as it propagates to the intended recipient node across a plurality of nodes.

53. A computer program product for facilitating messaging within a plurality of nodes as set forth in claim 52, wherein the means for modifying the data uses sensor information to modify the data of the message prior to re-transmission.

54. A computer program product for facilitating messaging within a plurality of nodes, with each node having a processor, a memory connected with the processor, and a directional communication interface, the computer program product comprising: a. a recording medium; b. means, recorded on the recording medium for facilitating reception of a message via the communication interface and providing the message to the processor and memory, the message including an address code and corresponding data, the address code including a relative target address of a node to which the corresponding message is intended to be sent; c. means, recorded on the recording medium for facilitating determination whether the address code in a received message indicates that the node receiving the message is the intended recipient of the message; d. means, recorded on the recording medium for modifying the message based on the direction from which the message was received, the address code in the message, and the direction to which the message is to be re-transmitted; and e. means, recorded on the recording medium for facilitating the re-transmission of the message via the directional communication interface, including the modified address code, in each direction in which it is to be re-transmitted; whereby a message may be propagated across the plurality of nodes until the message reaches the node to which the message is intended to be sent, and a message may be propagated across a plurality of nodes along multiple paths until the message reaches a desired recipient, thereby providing path redundancy without the need for the use of unique node identities; and wherein the computer program product is designed to facilitate message transmission and reception in four possible directions at 90 degree angles to each other and wherein a message is received from a direction represented by (X, Y), and wherein the address code is modified by the means for modifying such that when it is: a. transmitted 90 degrees to the left of the direction in which it is received, the modified address code is (Y, −(X+1)); b. transmitted along the same direction in which it is received, the modified address code is (X, Y−1); and c. transmitted 90 degrees to the right of the direction in which it is received, the modified address code is (−Y, X−1).

55. A computer program product for facilitating messaging within a plurality of nodes as set forth in claim 54, further including means, recorded on the recording medium, for time-stamping the message if it is initially transmitted from that node; means, recorded on the recording medium, for comparing the time-stamp to a current time at each node prior to re-transmission; and means, recorded on the recording medium, for halting the re-transmitting of the message if a predetermined amount of time has elapsed since the time-stamping of the message occurred, whereby messages can propagate through a plurality of nodes for a pre-specified amount of time and then are no-longer re-transmitted regardless of whether they reach the node to which they were intended to be sent.

56. A computer program product for facilitating messaging within a plurality of nodes as set forth in claim 54, further including means, recorded on the recording medium, for initializing a cumulative hop count in the message when it is initially transmitted from that node; means, recorded on the recording medium, for incrementing or decrementing the hop-count each time a message is re-transmitted from the node; and means, recorded on the recording medium, for halting the re-transmission of the message when the hop-count reaches a predetermined level at the node, whereby messages propagate through a plurality of nodes for a pre-specified number of hops and then are no-longer re-transmitted regardless whether they reach the node to which they were intended to be sent.

57. A computer program product for facilitating messaging within a plurality of nodes as set forth in claim 54, further including means, recorded on the recording medium, for providing a unique identifier for the message when it is initially transmitted; means, recorded on the recording medium, for checking and recording the unique identifier of the message at the node and determining whether the unique identifier of the message matches one previously stored; and means, recorded on the recording medium, for halting the re-transmission of the message if the unique identifier of the message matches one previously stored, whereby the messages propagate through a plurality of nodes only once.

58. A computer program product for facilitating messaging within a plurality of nodes as set forth in claim 54, wherein the means for facilitating the re-transmission of the message enables the message to be transmitted only in a subset of directions determined from the address code in the message and the direction from which the message was received.

59. A computer program product for facilitating messaging within a plurality of nodes as set forth in claim 54, further including means, recorded on the recording medium, for ensuring that when the message is re-transmitted, it is re-transmitted only in directions determined from the address code in the message.

60. A computer program product for facilitating messaging within a plurality of nodes as set forth in claim 54, further including means, recorded on the recording medium, for modifying the data of the message at a node prior to re-transmission, whereby the message may accumulate information as it propagates to the intended recipient node across a plurality of nodes.

61. A computer program product for facilitating messaging within a plurality of nodes as set forth in claim 54, wherein the data of the messages are commands.

* * * * *